E. A. WALL.
ROLL ADJUSTING MECHANISM.
APPLICATION FILED MAR. 20, 1914.
1,103,113.
Patented July 14, 1914.
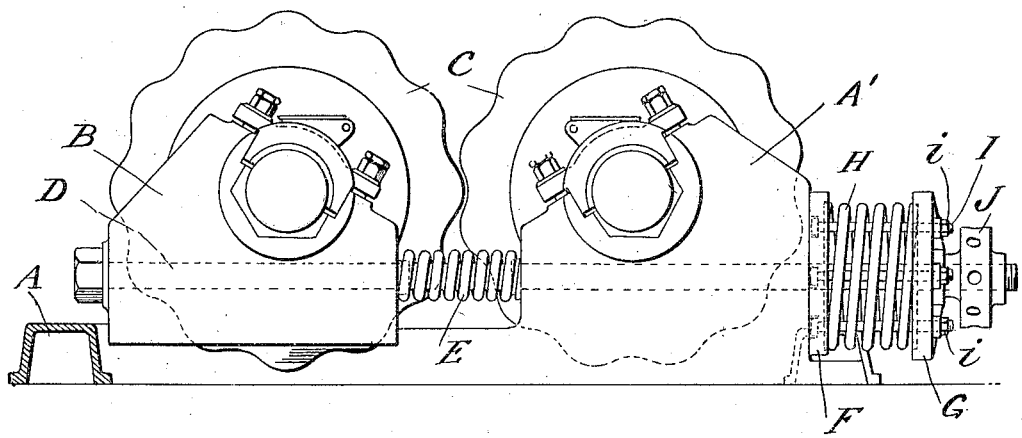
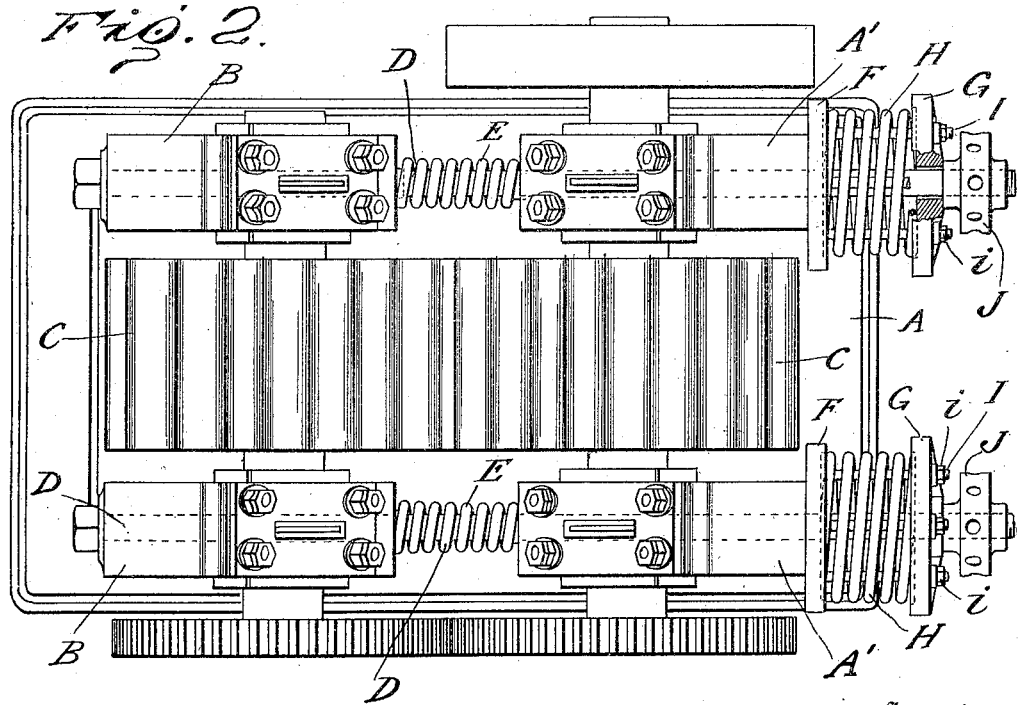

UNITED STATES PATENT OFFICE.

ENOS A. WALL, OF SALT LAKE CITY, UTAH.

ROLL-ADJUSTING MECHANISM.

1,103,113.  Specification of Letters Patent.  Patented July 14, 1914.

Application filed March 20, 1914. Serial No. 825,987.

*To all whom it may concern:*

Be it known that I, ENOS A. WALL, a citizen of the United States, residing at Salt Lake City, in the county of Salt Lake and State of Utah, have invented certain new and useful Improvements in Roll-Adjusting Mechanisms, of which the following is a specification.

My invention relates to roll adjusting mechanism for crushing and grinding rolls.

The object of the invention is to obviate the use of the spacing blocks used between the sliding and fixed bearings of crushing and grinding rolls, which blocks hold the rolls the desired distance apart for normal operation. By my improvement I provide two expansion springs between the two sets of bearings so that it is only necessary to loosen the nuts at the ends of the two usual adjusting rods when the rolls are to be adjusted farther apart, whereupon the springs will force the loose bearings and roll mounted therein away from the fixed bearings and the roll carried thereby. On the other hand, when the bodily movable roll is to be adjusted nearer to the other roll, then the nuts on the adjusting rods are merely screwed up or tightened, whereupon the springs will be compressed and the movable roll be brought closer to the other roll.

A further object is to provide in connection with the roll-separating springs roll-tension springs which encircle the adjusting rods and bear at one end on the end of the frame and at their opposite ends bear on tension plates which rest against the adjusting nuts on said rods and so are compressed when the rolls are forced apart by very hard lumps, &c.; said tension plates being provided with means for compressing the tension springs independent of the nuts on the adjusting rods.

These objects I accomplish by the construction shown in the accompanying drawing, in which:

Figure 1 is a side elevation of a pair of crushing rolls provided with my improved adjusting mechanism. Fig. 2 is a plan thereof.

A designates the bed having two fixed bearings A', two sliding bearings B, the two adjusting rods D D extending from the sliding bearings through openings in the fixed bearings A' in the manner common to this class of grinding apparatus. The rods D are extended beyond the fixed bearings and there provided with suitable adjusting nuts J.

E designates spiral springs mounted loosely on the rods D D between the sliding bearings B and the fixed bearings A'. The rolls C C are mounted in the bearings A' B and may be driven in any desired manner. The tension springs H are much larger and more powerful than the springs E, and bear at their inner ends against fixed abutments F at opposite sides of the end of the bed A, while the outer ends of the springs bear on tension plates G apertured centrally so as to slide on the rods D D. From the fixed abutments or plates F extend a plurality of adjusting bolts I parallel with the rods D, and these bolts I at their outer threaded ends pass through apertures in the tension plates G and are provided at the outer sides thereof with nuts $i$. It will be seen, therefore, that by adjusting the nuts $i$ to the desired extent proper tension may be given the springs H. After this tension has been adjusted it is only necessary to bring the two rolls C C into proper relation, and this is accomplished by turning the nuts J in the proper direction. The nuts J when turned to draw the movable bearings B toward the fixed bearings A' will compress the springs E, but will have no effect on the powerful tension springs H; all motion given the movable bearing being taken by the springs E alone. Thus it will be seen that the usual spacing blocks or stop bolts to limit the approach of the rolls toward each other are entirely obviated and, furthermore, the spacing is effected far more quickly, as the springs act by expansion to separate the rolls in proportion to the amount the nuts J are loosened. When objects too hard to be ground enter between the rolls they will force the rolls apart against the action of the springs H and so prevent injury.

The bolts I form a sort of cage encircled by the springs H, but they could encircle the springs, if preferred.

What I claim is:

1. The combination with a pair of rolls one of which is movable toward and from the other, the adjusting rods and tension springs, of lighter expansion springs between the said rolls and acting to force them apart, and means for effecting independent adjustment of said tension and expansion springs substantially as described.

2. The combination with a pair of rolls and their adjusting rods and tension springs, of lighter spiral expansion springs on the rods between the rolls and tending to force them apart, and means for effecting independent adjustment of said tension and expansion springs substantially as set forth.

3. The combination with a pair of rolls, adjusting rods, and spiral expansion springs on the rods between the rolls to force them apart, of lighter spiral tension springs on the outer ends of the rods, loose tension plates on the rods against which the outer ends of the tension springs bear, adjusting nuts for the expansion springs, mounted on the rods at the outer sides of the tension plates, a plurality of fixed bolts parallel with the rods and passing through said tension plates, and nuts on the bolts for setting up the tension plates and adjusting the tension of the springs; the inner ends of the tension springs bearing on a fixed part of the frame.

In testimony whereof I affix my signature in presence of two witnesses.

ENOS A. WALL.

Witnesses:
 A. M. PARKINS,
 GRACE P. BRERETON.

Copies of this patent may be obtained for five cents each, by addressing the "Commissioner of Patents, Washington, D. C."